United States Patent [19]

Kendall et al.

[11] 4,104,697

[45] * Aug. 1, 1978

[54] DISCRETE, FIXED-VALUE CAPACITOR

[75] Inventors: Don L. Kendall, La Paz, Mexico; Byron T. Ahlburn, Dallas; Klaus C. Wiemer, Richardson, both of Tex.

[73] Assignee: Texas Instruments Incorporated, Dallas, Tex.

[*] Notice: The portion of the term of this patent subsequent to Mar. 29, 1994, has been disclaimed.

[21] Appl. No.: 759,518

[22] Filed: Jan. 14, 1977

Related U.S. Application Data

[62] Division of Ser. No. 582,951, Jun. 2, 1975, Pat. No. 4,015,175.

[51] Int. Cl.² .............................................. H01G 1/01
[52] U.S. Cl. .................................... 361/305; 361/306; 361/313
[58] Field of Search ............... 361/304, 305, 313, 322, 361/306, 301, 309

[56] References Cited

U.S. PATENT DOCUMENTS

| 3,321,683 | 5/1967 | Tatem | 361/305 |
| 4,015,175 | 3/1977 | Kendall et al. | 361/313 |

Primary Examiner—Elliot A. Goldberg
Attorney, Agent, or Firm—James T. Comfort; Gary C. Honeycutt

[57] ABSTRACT

An axial-lead fixed-value capacitor comprising a metal-nitride-oxide-silicon chip in a standard diode package has been fabricated, having capacitance values in the 10 to 1000 pico-farad range. The device features a beveled-edge configuration which contributes to a low leakage current and also facilitates the sealing of the semiconductor chip in a double plug axial-lead package. The double layer dielectric medium comprises a thermally grown silicon oxide film typically 450 angstroms thick, for example, and a plasma deposited layer of silicon nitride typically 350 angstroms thick, for example.

5 Claims, 2 Drawing Figures

DISCRETE, FIXED-VALUE CAPACITOR

This is a division, of application Ser. No. 582,951, filed June 2, 1975 now U.S. Pat. No. 4,015,175.

This invention relates to the fabrication of a discrete, fixed-value, microelectronic capacitor chip suitable for assembly in a double-plug coaxial-lead glass sealed package. The capacitor chip, because of its mechanical characteristics, also lends itself readily to the assembly of hybrid circuit modules. The device features a beveled-edge geometry and a double-layer dielectric film on a semiconductor chip.

In the assembly of microelectronic devices, it is desirable to automate as many fabrication steps as possible to reduce manufacturing costs. The semiconductor industry has a long history of experience in the fabrication and handling of double-plug coaxial-lead glass-sealed diode packages. Production equipment is readily available for supplying such devices in reel-taped form, and for the automatic insertion of the devices into prepared circuit boards. Because of the established background of experience and equipment in this area which has contributed to greater ease of assembly, it is desirable to adapt devices other than diodes for assembly in such a packaged form.

Accordingly, it is an object of the present invention to provide a microelectronic fixed-value capacitor which is readily amenable to assembly in a double-plug coaxial-lead glass sealed package. It is a further object to provide a fabrication technique for such a capacitor capable of yielding, at high throughput rates, devices having extremely uniform parameters with excellent agreement between calculated and actual capacitance values. It is a further object to produce capacitors having reduced voltage dependence, i.e. fixed capacitance value, and substantially lower leakage currents than the standard ceramic capacitors.

One aspect of the invention is embodied in a microelectronic device comprising a monocrystalline semiconductor body having an active dopant concentration in excess of $10^{19}$ atoms per $cm^3$, a beveled periphery, and a composite plural layer dielectric film, in combination with compatible metal contacts to provide a fixed-value capacitance.

The preferred semiconductor body of the device is a silicon slice having substantially parallel, opposite faces and a (100) crystallographic orientation. Although other semiconductors are included within the scope of the invention, it will be apparent that the current sophistication of silicon processing technology permits a degree of uniformity and repeatability not readily attainable for other semiconductors.

The carrier concentration, preferably arsenic, exceeds $10^{19}$ atoms per $cm^3$. It is the free carrier concentration in the silicon which reduces voltage dependence of the capacitance value, thereby allowing the device to be used essentially as a fixed-value capacitor, and also reduces contact resistance at the backside which contributes to a higher quality factor (Q) than is possible for ceramic disc capacitors. The beveled periphery of the semiconductor chip is achieved by orientation-depedent etching such that the beveled edge lies in the (111) plane. The beveled edge results in a longer leakage path between contacts and hence contributes to the low leakage current which is characteristic of the device. The beveled geometry also facilitates the sealing of the wafer in a double plug coaxial package. Still further, the etched groove which forms the beveled surface also acts as a "scribe line" to facilitate the dicing of a processed wafer, which is typically about 50 mils on each side.

The plural layer dielectric film includes an initial layer of silicon oxide grown thermally to a thickness of at least 100 angstroms and preferably about 300 to 600 angstroms. The thermally grown oxide layer provides a stable interface with the silicon which is important to attain low leakage current. A second material, having a higher dielectric constant, is selected as a second dielectric layer having a thickness of at least 100 angstroms and preferably 200 to 600 angstroms. Leakage currents below 1 pico amp at 10 volts bias have been observed for devices having capacitance values in the 100 to 600 pico-farad range. This is to be compared with leakages up to the nanoampere range for standard capacitors. Additional dielectric layers may be added, or substituted for the nitride. A top metal contact and a backside metal contact are patterned to complete the chip.

For assembly, the chip is preferably sealed in a glass, double-plug, coaxial package with a nickel-plated silver preform on each side of the chip. The plug material is copper-clad dumet having copper-clad, cold-rolled steel leads. The glass is Corning 8870, for example. The glass sealed double-plug package is less susceptible to temperature degradation including hot solder damage, than ceramic disc capacitors. The double plug package also lends itself to reel taping and automatic insertion in the circuit boards.

Figure 1:
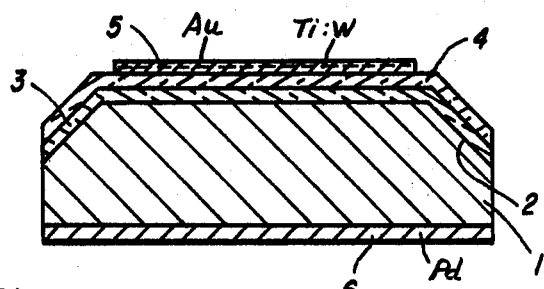
FIG. 1 is an enlarged cross-sectional view of the completed capacitor chip of the invention.

In FIG. 1, a preferred embodiment of the invention is seen to include silicon chip 1 having a (100) crystallographic orientation and an arsenic carrier concentration in excess of $2 \times 10^{19}$ $cm^{-3}$. It will be understood by those skilled in the art that the chip shown is one of a multiplicity of chips obtained by dicing a silicon slice comprised of a rectangular array of chips each of which, in this embodiment, measure 0.049 in. on a side.

The initial step in processing a silicon slice, according to the invention, is the patterning of a crystallographically-oriented, etch-resistant mask exactly covering that portion of the top surface which is to be maintained parallel with the backside of the wafer. The edge of each unit of the mask pattern is aligned with the intersection of a (111) plane with the wafer surface, whereby subsequent etching produces a V-shaped groove pattern which defines the beveled periphery 2 of each chip as illustrated in FIG. 1.

Next, the wafer is placed in an oxidation furnace at a temperature of 1100 to 1200° C for a time sufficient to form thermally grown silicon oxide film 3 having a thickness of about 450 angstroms. The wafer is then transferred to a glow-discharge plasma deposition reactor where silicon nitride layer 4 is deposited to a thickness of about 350 angstroms.

The top metal contact system 5 is then formed by first sputtering a mixed film of titanium and tungsten, followed by the sputtering of a gold layer and patterning the resulting contact pads photolithographically to provide an area suitable for determining the exact capacitance value of the completed device. The titanium-tungsten layer serves as a barrier to the diffusion of the gold contact metal, which in turn passivates the titanium-tungsten layer. Both the titanium-tungsten and the gold layer are successively sputtered during the same pump-down cycle.

The capacitance of the device is readily caclulated from the expression $$C = \xi\xi_o A/W$$

where
$\xi$ = the dielectric constant of the insulator
A = area of top metal contact
W = thickness of dielectric layer
$\xi_o$ = permittivity of free space For example, the illustrated device having 450 angstroms of oxide, 350 angstroms of silicon nitride, and 48 mil sq. contacts will have a capacitance of 774 picofarads.

Backside metal contact 6 is comprised of a nickel film covered by silver. The nickel has excellent alloying properties with silicon and the resultant contact system contributes significantly to the high quality factor that these devices demonstrate compared to ceramic disc capacitors.

Figure 2:
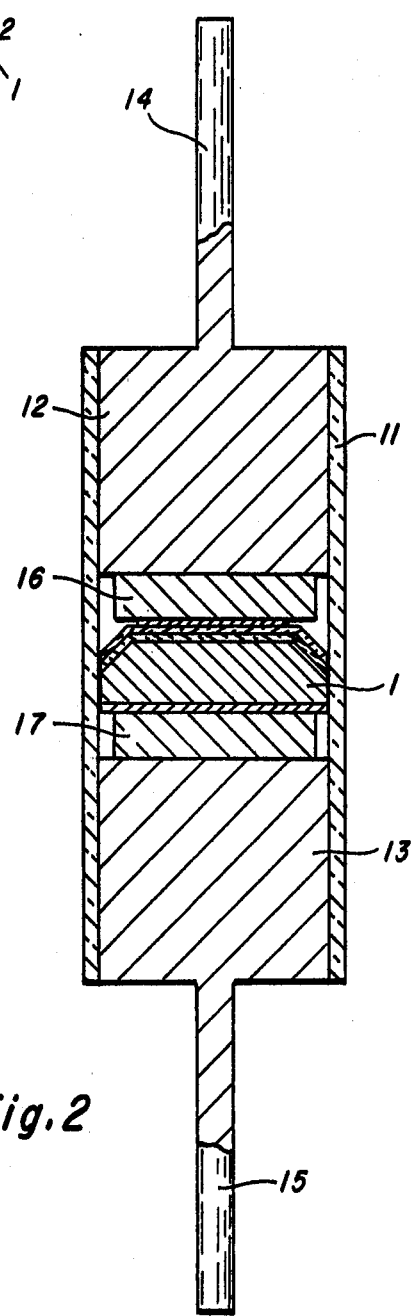
FIG. 2 is a cross-sectional view of a double-plug coaxial-lead glass sealed package containing the chip of FIG. 1.

In FIG. 2, the chip of FIG. 1 is shown packaged within a tubular glass envelope 11 having sealed therein dumet plugs 12 and 13 connected to copper-clad, cold-rolled steel leads 14 and 15. Nickel plated silver preforms 16 and 17 are sandwiched on either side of the chip between the dumet plugs whereby, upon heating, the preform is softened to complete the bonding of the chip contacts to the dumet plugs.

Performance comparisons between the device of FIG. 2 and ceramic disc capacitors have been performed. These include:

$$\frac{I(85°\text{ C})}{I(25°\text{ C})} ; (\text{MNOS} \rightarrow \simeq 1, \text{Ceramic} \simeq 10$$

Temperature coefficient of capacitance:
MNOS 0.003% per ° C.
Ceramic 0.003% per ° C.

Silicon slices having other crystallographic orientations are also useful in addition to the (100) orientation. Similarly, any sufficient highly doped semiconductor may be substituted, but not necessarily with equivalent results. Also, aluminum oxide, for example, may be substituted for either or both dielectric layers. Other top metal contacts that may be substituted for the titanium tungsten gold include titanium palladium silver, titanium tungsten aluminum or aluminum alone. Backside contacts which may be substituted for the nickel silver include nickel gold, palladium or gold alone.

In addition to being packaged in double plug coaxial glass packages, the device can be packaged in whisker packages, metal cans or plastic encapsulated lead-frame packages. Still further, for use in the assembly of hybrid circuit modules, the chip of the present invention is superior to standard capacitor chips because of its smaller size and because its bonding characteristics facilitate mounting on circuit boards and interconnection of individual chips with transistor and diode chips on the same board.

What is claimed is:

1. A capacitor device comprising a double-plug, coaxial-lead, glass-sealed package having a semiconductor capacitor chip sealed therein said chip comprising a monocrystalline silicon body doped to a concentration in excess of $10^{19}$ atoms per cm$^3$ and having first and second substantially parallel opposite faces, a first dielectric layer of thermally grown silicon oxide on said first face, a second dielectric layer on said oxide comprising silicon nitride, a first metal film comprising Ti:W on said nitride layer, a gold-comprising film on said Ti:W, and a metal contact comprising palladium on said second face.

2. A device as in claim 1, wherein said silicon oxide film is about 300–600 angstroms thick.

3. A device as in claim 2, wherein said silicon nitride is about 200–600 angstroms thick.

4. A device as in claim 1, wherein said dopant is arsenic.

5. A semiconductor capacitor chip comprising a monocrystalline silicon body doped to a concentration in excess of $10^{19}$ atoms per cm$^3$ and having first and second substantially parallel opposite faces, a first dielectric layer of thermally grown silicon oxide about 300–600 angstroms thick on said first face, a second dielectric layer on said oxide comprising silicon nitride about 200–600 angstroms thick, a first metal film comprising Ti:W on said nitride layer, a gold-comprising film on said Ti:W, and a metal contact comprising palladium on said second face.

* * * * *